US008212464B2

(12) United States Patent
Han et al.

(10) Patent No.: US 8,212,464 B2
(45) Date of Patent: Jul. 3, 2012

(54) BACKLIGHT UNIT OF LIQUID CRYSTAL DISPLAY DEVICE

(75) Inventors: Sang Ho Han, Gumi-si (KR); Je Young Moon, Chungcheongnam-do (KR)

(73) Assignee: LG Display Co., Ltd., Seoul (KR)

( * ) Notice: Subject to any disclaimer, the term of this patent is extended or adjusted under 35 U.S.C. 154(b) by 232 days.

(21) Appl. No.: 11/905,753

(22) Filed: Oct. 3, 2007

(65) Prior Publication Data

US 2008/0123024 A1    May 29, 2008

(30) Foreign Application Priority Data

Nov. 24, 2006  (KR) .................. 10-2006-0116949

(51) Int. Cl.
  *H01J 1/62*  (2006.01)
(52) U.S. Cl. ........................................ 313/487
(58) Field of Classification Search .............. 313/486, 313/487; 349/68, 70, 71, 106–109
See application file for complete search history.

(56) References Cited

U.S. PATENT DOCUMENTS

| | | | | |
|---|---|---|---|---|
| 5,541,476 A | * | 7/1996 | Suzuki | 313/487 |
| 5,811,924 A | * | 9/1998 | Okumura et al. | 313/487 |
| 2003/0151350 A1 | * | 8/2003 | Xu | 313/485 |
| 2004/0007961 A1 | * | 1/2004 | Srivastava et al. | 313/486 |
| 2005/0179358 A1 | * | 8/2005 | Soules et al. | 313/487 |
| 2006/0022582 A1 | * | 2/2006 | Radkov | 313/503 |
| 2006/0170319 A1 | * | 8/2006 | Oku et al. | 313/116 |

* cited by examiner

*Primary Examiner* — Toan Ton
*Assistant Examiner* — Andrew Coughlin
(74) *Attorney, Agent, or Firm* — McKenna Long & Aldridge LLP

(57) ABSTRACT

This invention relates to a backlight unit of a liquid crystal display device using a cold cathode fluorescent lamp that is capable of realizing pure colors and having a broad color reproduction range. A backlight unit of a liquid crystal display device according to an embodiment of the present invention includes at least one lamp including a first red phosphor having a dominant wavelength of about 620 nm, a second red phosphor having a dominant wavelength of about 658 nm, a green phosphor having a dominant wavelength of about 515 nm and a blue phosphor having a dominant wavelength of about 447 nm; a bottom cover in which the lamp is disposed; and an optical member disposed on the lamp.

2 Claims, 5 Drawing Sheets

BACKLIGHT UNIT OF LIQUID CRYSTAL DISPLAY DEVICE

This application claims the benefit of Korean Patent Application No. P2006-0116949, filed on Nov. 24, 2006, which is hereby incorporated by reference for all purposes as if fully set forth herein.

BACKGROUND OF THE INVENTION

1. Field of the Invention

The present invention relates to a backlight unit of a liquid crystal display device, and more particularly, to a backlight unit of a liquid crystal display device using a cold cathode fluorescent lamp that is capable of realizing pure colors and that has a broad color reproduction range.

2. Discussion of the Related Art

A liquid crystal display device is a flat display device of a wide ranging variety of uses from that of office equipment to computer monitors to large-sized televisions due to ever-developing process and drive technologies. The liquid crystal display device controls light transmittance of a liquid crystal material through application of an electric field, thereby displaying a picture. A liquid crystal display device includes a liquid crystal display panel in which liquid crystal cells are arranged in a matrix pattern and a drive circuit for driving the liquid crystal display panel.

A liquid crystal display panel may be formed by bonding a thin film transistor substrate, on which thin film transistor arrays are formed, and a color filter substrate, on which color filter arrays are formed, with a liquid crystal layer therebetween.

M number of data lines and n number of gate lines substantially perpendicularly cross each other in the thin film transistor array substrate of the liquid crystal display panel, and accordingly, m×n number of liquid crystal cells are arranged in a matrix pattern. A thin film transistor is connected at each crossing of the data lines and the gate lines, and supplies data voltages applied through the data line to a pixel electrode of the liquid crystal cell in response to scan pulses of the gate line.

A black matrix, color filters, and a common electrode may be formed on a color filter substrate. The liquid crystal cell rotates liquid crystal having dielectric anisotropy by application of a potential difference between the data voltage supplied to the pixel electrode and the common voltage supplied to the common electrode. Thus, light transmittance is controlled.

Polarizers having optical axes substantially perpendicularly crossing each other may be adhered to the thin film transistor substrate and the color filter substrate of the liquid crystal display panel. An alignment film which determines a pre-tilt angle of the liquid crystal may further be formed on the inner surface thereof which is in contact with the liquid crystal layer. A storage capacitor may be further formed in each liquid crystal cell. The storage capacitor may be formed between the pixel electrode and the pre-stage gate line or between the pixel electrode and the common line, thereby uniformly maintaining the data voltage charged in the liquid crystal cell.

The drive circuit of the liquid crystal display device includes a data drive circuit and a gate drive circuit. The data drive circuit supplies data voltages to the data lines and the gate drive circuit sequentially supplies scan pulses to the gate lines to select the horizontal line of the liquid crystal cell to which the data voltage is supplied.

The liquid crystal display device is not a self luminous display device, thus a separate light source such as a backlight is required.

The lamps used as the backlight may include a cold cathode fluorescent lamp (CCFL), an external electrode fluorescent lamp (EEFL), and a light emitting diode (LED) by way of non-limiting example.

FIG. 1 is a diagram representing a cross section of a related art CCFL among the foregoing lamps.

Referring to FIG. 1, the CCFL includes a glass tube 2; electrodes 4 located at both ends of the inside of the glass tube 2; and lead wires 6 which supply voltages from the outside to the electrodes 4. Further, phosphor 8 is spread over the internal surface of the glass tube 2, and a gas mixture of mercury, argon, neon and the like is injected into an interior space 10 of the glass tube 2.

If a voltage is supplied to the electrode 4 through the lead wire 6, electrons within the interior space 10 move at a high speed by being drawn to the electrode 4, thereby colliding with the electrode 4 so as to emit secondary electrons. The emitted secondary electrons collide with mercury atoms in the interior space 10 to irradiate ultraviolet rays, and the ultraviolet rays are converted into visible rays by the phosphor 8, thereby emitting light through the glass tube 2.

Phosphor 8 may include red R phosphor, green G phosphor and blue B phosphor, for example. Emitted color can be selected by controlling the mixing ratio of the R phosphor, G phosphor and B phosphor.

The liquid crystal display device might realize a desired color by irradiating the white light generated as a result of a combination of the R phosphor, G phosphor and B phosphor, to the color filter in accordance with the transmittance control of the liquid crystal.

FIG. 2 is a graph representing a phosphor wavelength spread over a CCFL of the related art, and a color filter wavelength of a color filter substrate of a liquid crystal display panel. Herein, the solid line represents a wavelength of each of R, G and B color filters, and the dotted line represents a phosphor wavelength. Further, the horizontal axis represents wavelength (nm), and the longitudinal axis represents percent of transmittance in accordance with each wavelength. Transmittance value is a percent of light transmittance based upon the assumption that maximum transmittance of the phosphor is 100%.

Referring to FIG. 2, the phosphor includes an R phosphor having a dominant wavelength of about 612 nm, a G phosphor having a dominant wavelength of about 545 nm, and a B phosphor having a dominant wavelength of about 450 nm. The lights generated in the R phosphor, G phosphor and B phosphor are mixed into a white light with transmittance controlled by the liquid crystal, as described above. Lights are radiated as a red light, green light and blue light by the R, G and B color filters, respectively.

The CCFL using the R phosphor, G phosphor and B phosphor, of which each has one dominant wavelength, is called a three-wavelength CCFL.

FIG. 3 is a related art chromaticity diagram illustrating a color reproduction range of the three-wavelength CCFL.

The three-wavelength CCFL of the related art has a color reproduction range of about 72% compared with an NTSC system (the color reproduction range in accordance with the NTSC system being the color television system established by US National Television System Committee (NTSC)) of about 100%. The CCFL can embody a wide variety of colors because of the phosphors' broad color reproduction range. However, a problem with the CCFL is that the various colors cannot be embodied because the three-wavelength CCFL does not satisfy the color reproduction range required by the NTSC system. Particularly, the three-wavelength CCFL of the related art has a wavelength of each phosphor located in the wavelength overlap area of the B color filter and the G color filter and in the wavelength overlap area of the G color filter and the R color filter, as shown in FIG. 2. Thus, it is difficult to realize pure blue and green colors. Also, the dominant wavelength of the R phosphor is about 612 nm, thus it is difficult to realize a dark red which is embodied in a wavelength substantially longer than 612 nm.

SUMMARY OF THE INVENTION

Accordingly, the present invention is directed to a backlight unit of a liquid crystal display device. Such a devise uses a cold cathode fluorescent lamp that is capable of realizing pure colors and that has a broad color reproduction range that substantially obviates one or more of the problems due to limitations and disadvantages of the related art.

An advantage of the present invention is to provide, a backlight unit of a liquid crystal display device which irradiates light onto a liquid crystal display panel that includes at least one lamp including a first red phosphor having a dominant wavelength of about 620 nm, a second red phosphor having a dominant wavelength of about 658 nm, a green phosphor having a dominant wavelength of about 515 nm and a blue phosphor having a dominant wavelength of about 447 mn; a bottom cover in which the lamp is disposed; and an optical member disposed on the lamp.

Another advantage of the present invention is to provide in the backlight unit of a liquid crystal display device, the first red phosphor is formed of $YVO_4$ phosphor, the second red phosphor is formed of Ge phosphor, the green phosphor is formed of a mixture including manganese added to a BAM group phosphor, and the blue phosphor is formed of a SCA group blue phosphor.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit of a liquid crystal display devise which irradiates light onto a liquid crystal display panel, comprises: at least one lamp including a first red phosphor having a dominant wavelength of about 620 nm, a second red phosphor having a dominant wavelength of about 658 nm, a green phosphor having a dominant wavelength of about 515 nm and a blue phosphor having a dominant wavelength of about 447 nm; a bottom cover in which the lamp is disposed; and an optical member disposed on the lamp.

Another aspect of the present invention includes a four-wavelength lamp for a liquid crystal display devise comprising: a first red phosphor having a dominant wavelength; a second red phosphor having a dominant wavelength substantially different from that of the first red phosphor; a green phosphor having a dominant wavelength; and a blue phosphor having a dominant wavelength such that a broad color reproduction range is realized.

Another aspect of the present invention includes a method of manufacturing a four-wavelength lamp for a liquid crystal display device comprising: forming a first red phosphor of a $YVO_4$ phosphor; forming a second red phosphor of a Ge phosphor; forming a green phosphor of a mixture of manganese added to a phosphor of a BAM group phosphor; and forming a blue phosphor of an SCA group phosphor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 4:
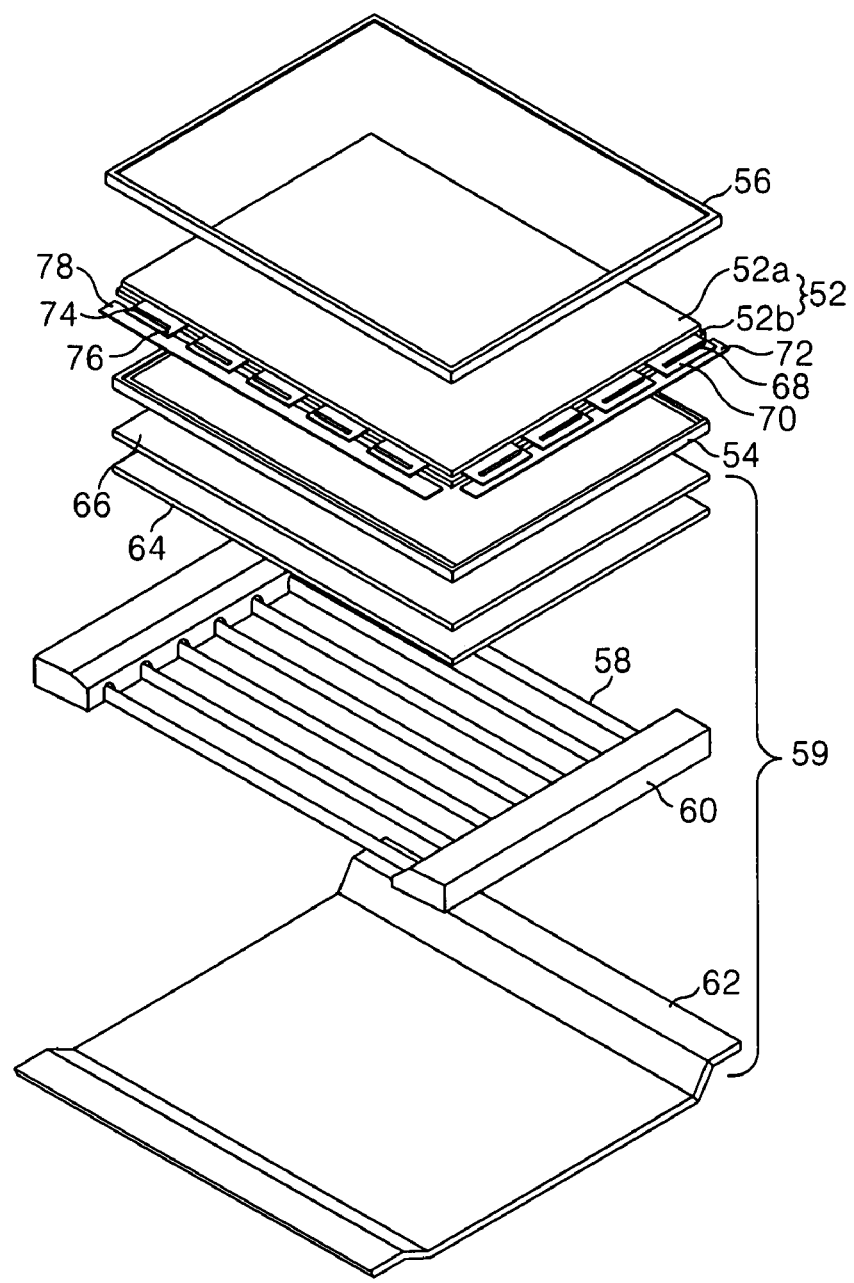
FIG. 4 is a diagram representing a liquid crystal display device which uses a backlight unit according to the present invention.
Figure 5:
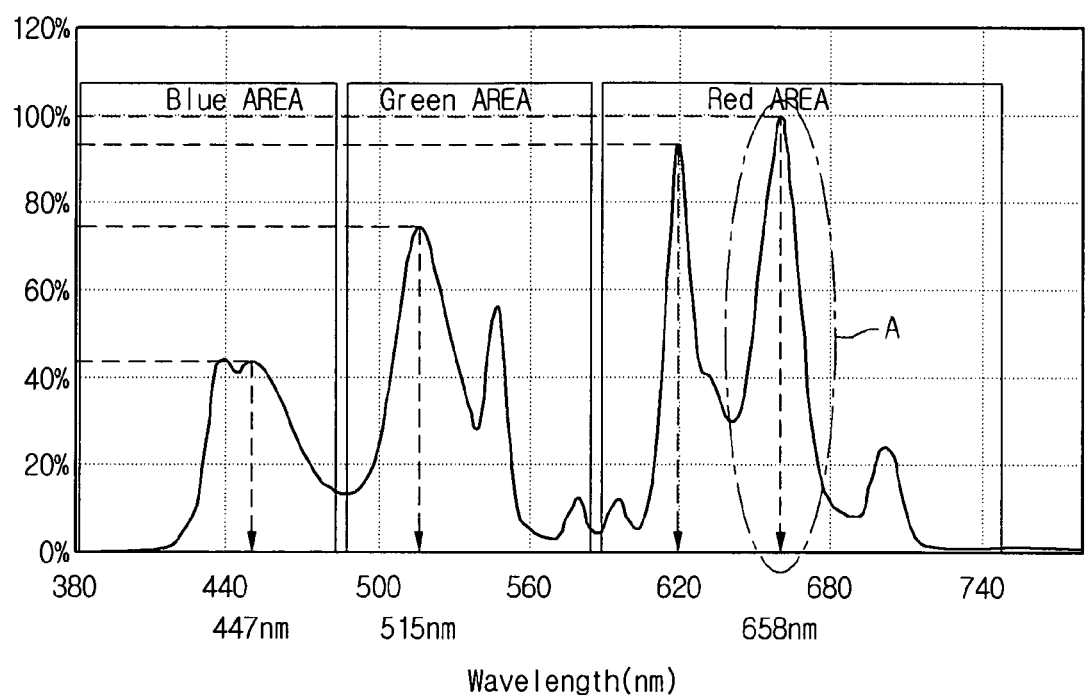
FIG. 5 is a graph representing a phosphor wavelength spread over a cold cathode fluorescent lamp according to the present invention.

With reference to FIGS. 4 to 5, embodiments of the present invention will be explained as follows.

FIG. 4 is a diagram representing a liquid crystal display device which uses a backlight unit according to the present invention.

Referring to FIG. 4, a liquid crystal display device adopting a backlight unit according to the present invention includes a liquid crystal display panel 52; a panel guide 54 within which the liquid crystal display panel 52 is deposited; a top case 56 which covers the edge of the liquid crystal display panel 52; and a backlight unit 59 which irradiates light to the liquid crystal display panel 52.

The liquid crystal display panel 52 includes a color filter substrate 52a and a thin film transistor substrate 52b. Liquid crystal cells are formed to be arranged in an active matrix pattern between the color filter substrate 52a and the thin film transistor substrate 52b.

On the thin film transistor substrate 52b a plurality of data lines and a plurality of gate lines which cross each other are arranged, and a thin film transistor (TFT) is formed at each crossing part thereof. The TFT supplies the data from the data line to the liquid crystal cell in response to scan pulses from the gate line. A gate electrode of the TFT is connected to the gate line and a source electrode is connected to the data line. A drain electrode of the TFT is connected to a pixel electrode of the liquid crystal cell. Further, in the thin film transistor substrate 52b a storage capacitor is formed for maintaining voltages of the liquid crystal cell. The storage capacitor can be formed between the liquid crystal cell and the pre-stage gate line, or between the liquid crystal cell and a separate common line.

In the color filter substrate 52a, a color filter, a common electrode, and a black matrix, for example, may be formed. The color filters may include red R, green G and blue B color filters and extract the desired colors from the light supplied from a backlight unit 59.

In each of the color filter substrate 52a and the thin film transistor substrate 52b a polarizer for filtering linearly-polarized light and an alignment film for setting a pre-tilt angle of liquid crystal molecules may be formed. The liquid crystal molecules of the liquid crystal cell are driven in accordance with an applied electric field between the common electrode of the color filter substrate 52a and the pixel electrode of the thin film transistor substrate 52b, thereby modulating the light incident from the backlight unit 59 through the polarizer.

On the thin film transistor substrate 52b of the liquid crystal display panel 52 are mounted a gate tape carrier package (TCP) 70 on which there is mounted a gate integrated circuit 68 receiving signals from a gate printed circuit board (PCB) 72 to generate gate signals, and a data TCP 76 on which there is mounted a data integrated circuit 74 receiving signals from a source PCB 78 to generate data signals. Thus signals are supplied to the gate line and the data line.

A molded panel guide 54 is formed for a side wall surface there within to be a stepped surface. The liquid crystal display panel 52 is mounted on the inside of the panel guide 54.

A top case 56 is manufactured in a substantially rectangular band shape which is substantially perpendicularly bent to have a plane surface part and side surface parts. The top case 56 is formed to cover the edge of the panel guide 54 and the liquid crystal display panel 56.

The backlight unit 59 includes a plurality of lamps 58 disposed under the liquid crystal display panel 52; a side support 60 on which the lamps 58 are mounted; a bottom cover 62 combined with the side support 60; a diffusion plate 64 located towards the upper part of the lamps 58; and a plurality of optical sheets 66 are located above the upper part of the diffusion plate 64.

The diffusion plate 64 may include a plurality of beads, and disperses the light incident through the lamps 58 via the beads, thereby creating no brightness difference between the locations of the lamps 58 in the display surface of the liquid crystal display panel 52. The diffusion plate 64 may be made such that beads are scattered within a medium having the same refractive index as the beads. Thus, light cannot be condensed.

Optical sheets 66 may include one or more diffusion sheets and one or more prism sheets, and the optical sheet uniformly irradiates the light incident from the diffusion plate 64 onto the whole of the liquid crystal display panel 52 and turns the progress path of the light in a substantially perpendicular direction to the display surface, thereby acting to condense the light to the front of the display surface.

Figure 1:
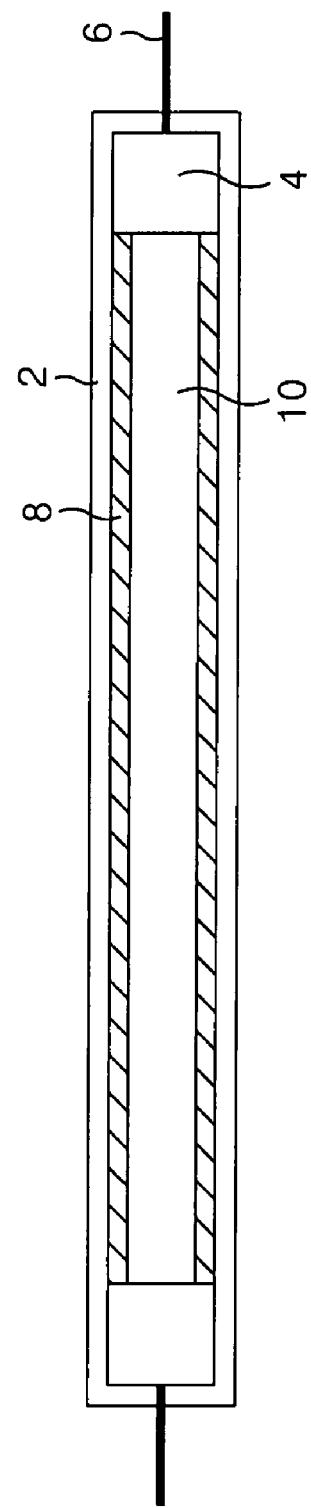
FIG. 1 is a cross sectional diagram of a related art cold cathode fluorescent lamp.
Figure 2:
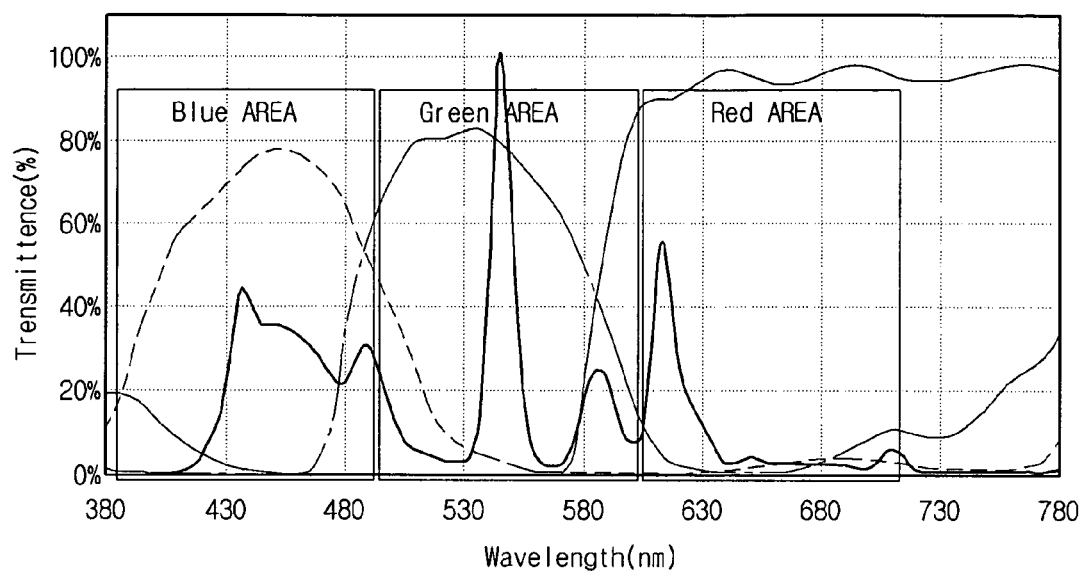
FIG. 2 is a related graph representing a phosphor wavelength spread over a cold cathode fluorescent lamp and a color filter wavelength formed in a color filter substrate of a liquid crystal display panel.
Figure 3:
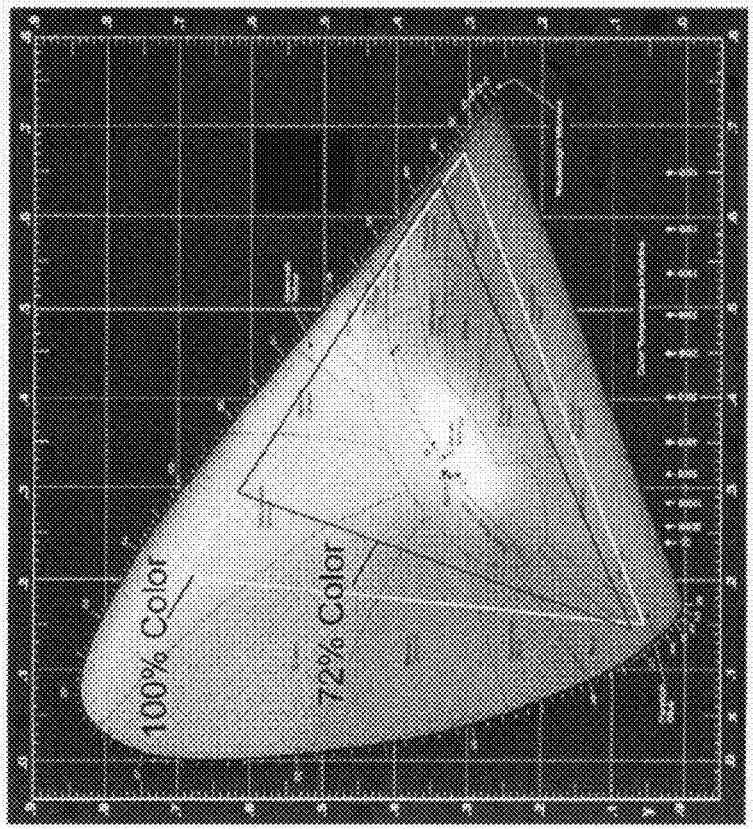
FIG. 3 is a related art chromaticity diagram illustrating a color reproduction range of a three-wavelength cold cathode fluorescent lamp.

The lamps 58 may be cold cathode fluorescent lamps CCFL and have the same operation principle as the CCFL of the related art shown in FIG. 1. However, the lamp 58 according to the present invention is a four-wavelength CCFL which has a total of four dominant wavelengths by using a G phosphor and a B phosphor that each have one dominant wavelength, and two R phosphors that each have one dominant wavelength. The CCFL of the backlight unit of the related art uses is a three-wavelength CCFL in which a red R phosphor, a green G phosphor and a blue B phosphor each have one dominant wavelength.

FIG. 5 is a spectrum representing a phosphor wavelength spread in a CCFL according to the present invention. Red R, green G and blue B areas represent wavelength ranges of the phosphor each realized in red, green and blue by the color filter. Further, the horizontal axis represents wavelength (nm), and the vertical axis represents percent transmittance in accordance with each wavelength. Transmittance value is a percent of light transmittance assuming that the maximum transmittance of the phosphor is 100%. Herein, the wavelength generating maximum brightness in each of the R, G, and B phosphors is a dominant wavelength of the phosphor.

Referring to FIG. 5, the phosphor of the CCFL according to the present invention includes a first R phosphor having a dominant wavelength of about 620 nm, a second R phosphor having a dominant wavelength of about 658 nm, a G phosphor having a dominant wavelength of about 515 mn, and a B phosphor having a dominant wavelength of about 447 nm.

The R phosphor of the related art has the dominant wavelength of about 612 nm, but the R phosphor of the present invention has two dominant wavelengths of about 620 nm and about 658 nm. That is to say, the CCFL according to the present invention has a broader color range when compared with the related art, because the first R phosphor has its dominant wavelength of about 620 nm, which is substantially longer than the dominant wavelength of the related art of about 612 nm. In addition, the phosphor of the CCFL according to the present invention further includes the second R phosphor having its dominant wavelength of about 658 nm ("A" of FIG. 5), so that dark red can be realized, thereby having a broader color reproduction range. The first R phosphor may be formed of Yttrium Vanadate ($YVO_4$) phosphor and the second R phosphor may be formed of, for example, Germanium (Ge) phosphor.

Further, the dominant wavelengths of the G and B phosphors are each moved to about 515 nm and about 447 nm to clearly divide the colors of the R and G phosphor, thereby making it possible to realize purer red and blue colors than the related art. The G phosphor may be formed by adding manganese Mn to a phosphor of a BAM group and the B phosphor may be formed of a blue phosphor of a SCA group. BAM and SCA are abbreviations of the blue phosphor compound. The BAM group phosphor may be expressed chemically as $BaMg_2Al_6O_{27}$:Eu with a peak wavelength of 450 nm. The SCA group phosphor may be expressed chemically as $(Sr, Ca, Ba)_5(PO_4)3Cl$:Eu with a peak wavelength of 447 nm. BAM is the standard blue phosphor for making a cold cathode fluorescent lamp (CCFL) and SCA is used to express a more deep color in the CCFL because of the wavelength separation between the green and blue wavelengths. SCA blue is sharper than BAM near the green wavelength band.

Regarding the spectrum of the whole phosphor, the first R phosphor is about 15-20% of the area, the second R phosphor is about 30-40% of the area, the G phosphor is about 20-30% of the area and the B phosphor is about 20-25% of the area.

In FIG. 5, the wavelengths located at parts except the dominant wavelengths of the R, G and B phosphors are auxiliary wavelengths of each phosphor, thus the effect on the color realization is insignificant when compared with the dominant wavelength.

The CCFL according to the present invention further includes the separate R phosphor having its dominant wavelength in a long wavelength range when compared with the related art and can realize pure colors because the wavelength of the phosphor is clearly divided in accordance with each color area without overlap. Thus, the color reproduction range might reach about 100% or more when compared with the color reproduction range of the NTSC system.

As described above, the backlight unit of the liquid crystal display device according to the present invention includes a cold cathode fluorescent lamp including a first red phosphor having its dominant wavelength of about 620 nm, the second red phosphor having its dominant wavelength of about 658 nm, the green phosphor having its dominant wavelength of about 515 nm and the blue phosphor having its dominant wavelength of about 447 nm. The dominant wavelength may be the maximum wavelength. Accordingly, the backlight unit of the liquid crystal display device according to the present invention can realize pure colors by clearly dividing color area without overlap, and might also broaden the color reproduction range by the red phosphor having a long wavelength.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit of a liquid crystal display device which irradiates light onto a liquid crystal display panel, comprising:
    at least one lamp having a total of four peak wavelengths including a first red phosphor having the peak wavelength of about 620 nm, a second red phosphor having the peak wavelength of about 658 nm, a green phosphor having the peak wavelength of about 515 nm and a blue phosphor having the peak wavelength of about 447 nm;
    a bottom cover in which the lamp is disposed; and
    an optical member disposed on the lamp,
    wherein the transmittance value in a phosphor spectrum area of the peak wavelength of the first red phosphor is about 95%,
    wherein the transmittance value in a phosphor spectrum area of the peak wavelength of the second red phosphor is about 100%,
    wherein in a phosphor spectrum area, the first red phosphor is about 15-20% of the total area thereof, the second red phosphor is about 30-40% of the total area thereof, the green phosphor is about 20-30% of the total area thereof and the blue phosphor is about 20-25% of the total area thereof
    wherein the lamp is a cold cathode fluorescent lamp that includes a glass tube,
    wherein an interior space of the glass tube is injected a gas mixture of mercury, argon and neon,
    wherein the transmittance value of the peak wavelength of the first red phosphor is smaller than the transmittance value of the peak wavelength of the second red phosphor,
    wherein the transmittance value of the peak wavelength of the green phosphor is smaller than the transmittance value of the peak wavelength of the first red phosphor,
    wherein the transmittance value of the peak wavelength of the blue phosphor is smaller than the transmittance value of the peak wavelength of the green phosphor.

2. The backlight unit of a liquid crystal display device according to claim 1, wherein the first red phosphor is formed of $YVO_4$ phosphor, the second red phosphor is formed of Ge phosphor, the green phosphor is formed of a mixture of manganese added to a phosphor of a BAM group phosphor, and the blue phosphor is formed of a blue phosphor of a SCA group phosphor.

* * * * *